Figure 4:
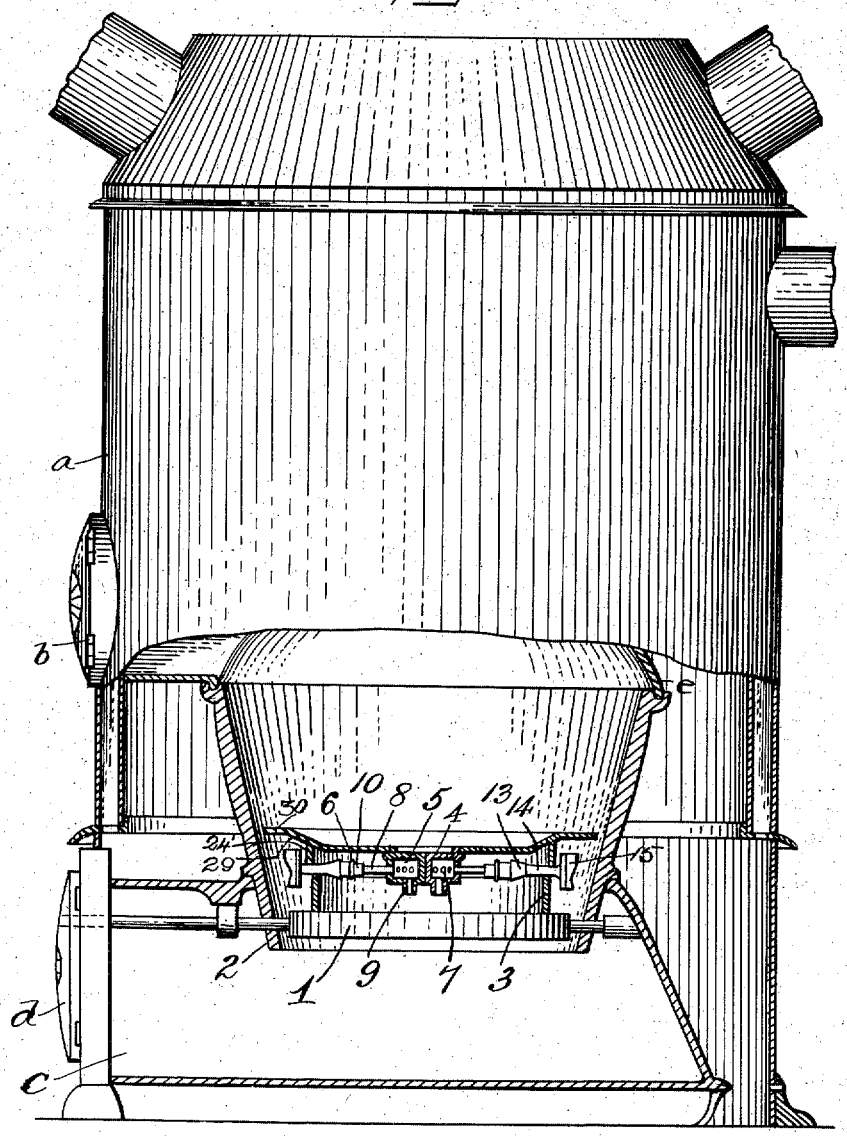

Oct. 8, 1929. H. S. BENNETT. Re. 17,454
FURNACE.
Original Filed Oct. 24, 1910
2 SHEETS—SHEET 1.
Fig. 1.
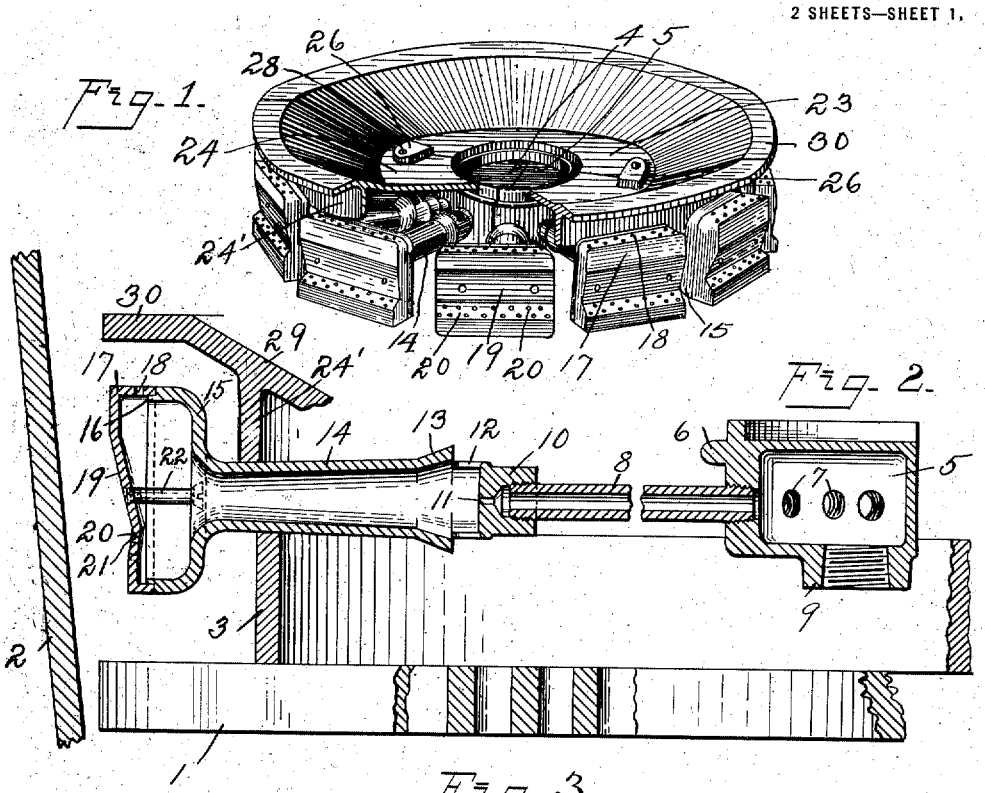
Fig. 2.
Fig. 3.
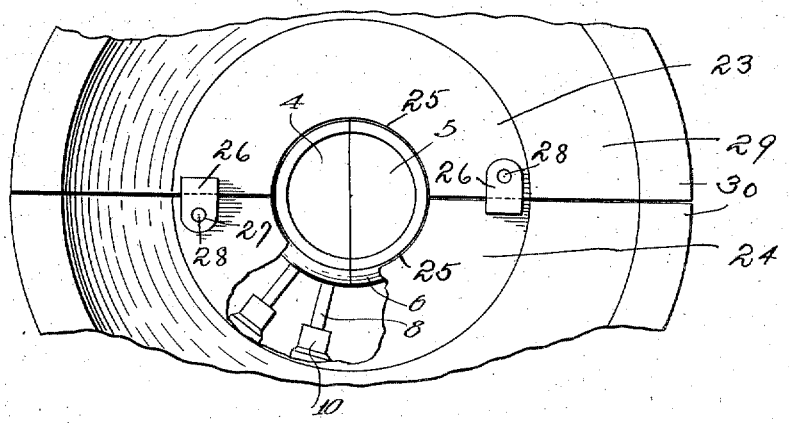
Witnesses:
C. H. Tresch.
F. M. Case.
Inventor
Horatio S. Bennett
By
B. W. Brockett.
his Attorney.

Oct. 8, 1929. H. S. BENNETT. Re. 17,454

FURNACE.

Original Filed Oct. 24, 1910

2 SHEETS—SHEET 2.

Witnesses
A. L. Lord,
D. Tozer.

Inventor
Horatio S. Bennett

By B. W. Brockett
Attorney.

Reissued Oct. 8, 1929 Re. 17,454

UNITED STATES PATENT OFFICE

HORATIO S. BENNETT, OF CLEVELAND, OHIO, ASSIGNOR, BY MESNE ASSIGNMENTS, TO THE COLUMBIA BURNER COMPANY, A CORPORATION OF OHIO

FURNACE

Original No. 1,216,928, dated February 20, 1917, Serial No. 588,725, filed October 24, 1910. Application for reissue filed August 8, 1929. Serial No. 384,309.

In the furnace industry it has been customary at the present time to employ practically one type of burner, wherein the lower part of the fire-pot at or near the grate is entirely or partially sealed with the burners arranged above the same and in a manner to project their flames against the inner surface of the fire-pot, all the air to support combustion and to form the mixture for the burning operation being furnished through the mixers of the several burners. This quantity of air is insufficient at any time to produce complete combustion of the gas, even when a good mixture is formed within the burner itself, so that when the bottom of the fire-pot is closed, there is no additional air to support combustion in the furnace, and a great deal of unburnt gas flows out through the stack. This is especially true in natural gas burners for in some instances, it has been an actual fact that a flame could be sustained at the top of a chimney with a burner of this type showing that a large volume of the unburnt gas passes out at this point.

It is the object of the present invention, therefore, to provide a burner which is free and open at the bottom and is used in conjunction with a spreading device or striker plate arranged above the burner and adapted to direct the flames toward the fire-pot and at the same time to restrict the flow of the burning mixture and air at a point adjacent to the fire-pot and above the burner, thereby preventing the loss of unburnt gas or in other words producing complete combustion at this point and raising the heat yield of the fuel. In actual practice the applicant, who is engaged in the manufacture of furnaces and burners, has found that with his burner there is a greater heat yield for a small consumption of fuel due to his construction.

It is also one of the principal features of this invention to use in conjunction with this arrangement a burner supplying a substantially continuous flame around the entire burner, thereby preventing the free passage of unheated air between sections of flames produced by the several burner sections. In this way all air passing up into the heating drum is heated to a high temperature.

The invention comprises the construction and arrangement of parts hereinafter described and claimed.

Referring to the drawings, Figure 1 is a view of the burner partly in section; Fig. 2 is a sectional view of one of the burner sections showing the main supply chamber in section and showing the burner mounted above a grate and illustrating the relation of the burner head with respect to the spreading plate and the fire-pot; Fig. 3 is a top plan view of the spreader plate showing the mode of connection between the parts thereof and Fig. 4 is a view showing a furnace with parts broken away to show the invention applied thereto.

In carrying out my invention any preferred form and construction of parts may be employed so long as they possess the necessary characteristics, but I have shown one form in the drawings which is highly effective in operation, and in such embodiment 1 represents the grate and 2 represents the fire-pot both of which are of any ordinary construction, and, as usual, are inclosed in a casing or jacket *a* having a firing door *b*, and ash pit *c* provided with a door *d*, and a dome *e* above said fire-pot leading to the customary heating drum (not shown), which may be of any suitable construction, for example, of the form shown in the patent to Schaffer No. 675,978, granted June 11, 1901. In mounting the burner I prefer to employ an annular ring 3 which rests upon the open grate and supports the device. The burner which rests upon this ring consists of a main cast gas receiving or supply chamber preferably comprising half-round portions 4 and 5 each of which is semi-circular in form and has upon its periphery a flange 6 and suitable openings 7, for receiving nipples 8 upon which the burner sections are mounted. Each of these half round gas receiving chamber portions is provided with a gas inlet connection 9 which leads to suitable source of supply. Mounted upon the end of each nipple 8 is a jet nipple 10 having a gas orifice 11 therein and connected by suitable webs 12 with a mixer 13 integral with and forming a part of a mixing tube 14 upon the end of which is a mixing casing member 15 which is preferably rectangular and is provided with a flange 16 about its edge forming a seat for receiving the burner plate 17 which is provided upon its upper edge with a group of gas openings 18 arranged at the rear of the outer edge of the burner plate. The burner plate is still further provided with an inwardly beveled face portion 19 extending to an outwardly inclined or beveled face portion 20 which is provided with a group of gas orifices 21. The edge of this burner plate seats against the shoulder formed by the flange 16 and it is held in place by two screws 22 which pass through the casing member 15, through the mixing chamber and into threaded openings in the plate 17. The arrangement of the parts is such that air envelops each of the burner heads and supports combustion. In this way the flames are supplied with an ample amount of air for taking care of combustion. The burner sections are also arranged so that they form a continuous flame around the burner thereby heating all of the passing air.

In order to retard the flow of the burning mixture and air and thereby to insure complete combustion and further in order to cause the flames to impinge directly against the fire-pot a suitable spreading or striker plate is provided, and it is composed of semi-circular members 23 and 24 which fit the two half receiving chamber sections and rest upon the flanges 6 at the center. A suitable semi-circular opening 25 is provided at the center of each of these members and for accommodating the gas-receiving chamber as above outlined. These half-sections are each provided with a downwardly extending flange 24′ which rests on the mixing tubes 14 and are secured together by lugs 26 provided with openings 27 engaging pins 28 secured in the plates. The arrangement of this lug-and-pin construction is such that there is a lug carried by each plate on the opposite side of the center with a pin opposite, so that when the plates are placed in their straight edges edge to edge and moved slightly out of the same plane, the lugs may be brought down upon the pins so that the spreader will be locked together upon the gas receiving chamber. Each half of this spreading plate is provided with an upwardly inclined portion 29 terminating in a flat edge portion 30 which extends over the burner heads and toward the fire-pot and serves to retard the flow of burning gas and air and to direct the flames against the surface of the fire-pot. By this arrangement the greatest possible amount of heat is obtained from the fuel.

In operation, the flame produced by the burner sections rises in a substantially continuous formation around the furnace against the striker plate, and is thereby directed against the fire-pot when the heat of the flames will cause an upward circulation of air which enters freely through the grate and passes up through and with the flames, the flow at the periphery of the striker plate and between it and the fire-pot being so retarded or restricted that complete combustion is produced, and all the air entering the drum is thoroughly heated and none is permitted to pass between the sections of flames unheated.

By constructing a burner in the manner set forth and supporting it upon the ring 3 which rests on the grate it may be disassembled and removed from the furnace readily to permit the use of solid fuel, the parts being such that the fuel pipes extend up from the grate.

Having thus described my invention, I claim:—

1. In a furnace, a fire-pot, a striker plate extending within the fire-pot to a point near the interior wall thereof, and a burner structure having burner orifices located to project the flames against the fire-pot and against the edge of the striker plate, said striker plate preventing air from passing upward through the fire-pot except between the edge of the striker plate and the fire-pot wall in contact with the flames.

2. In a furnace, a fire-pot, a striker plate means mounted therein and having its edge terminated at a point near the fire-pot wall, and a burner structure having burner orifices which project their flames against the striker plate means and thence through the space between the edge of the srtiker plate means and the fire-pot wall, said means preventing air from passing up through the fire-pot other than through said space.

3. In a furnace, a circular fire-pot, a striker plate having its periphery extending to a point near the fire-pot, a burner comprising a plurality of sections each having a burner head with a group of burner orifices for projecting flames against the underside and near the periphery of the striker plate and another group of burner orifices for projecting flames directly against the fire-pot.

4. In a furnace, a fire-pot, a burner supported near its bottom and comprising a plurality of burner sections each having a horizontally disposed group of discharge orifices for directing the flame against the fire-pot and a group of discharging orifices directing the flame upwardly, and a striker plate above the burner and having its periphery extending near the fire-pot above the last named burner orifices, said orifices producing a substantially continuous flame around the entire burner.

5. In a furnace, a fire-pot, a burner supported near the bottom of the fire-pot and comprising a plurality of burner sections each having a head provided with a horizontally disposed group of discharge orifices for directing the flame against the fire-pot, and a group of discharge orifices directing the flame upwardly, a striker plate above the burner and having its periphery near the fire-pot above the last named orifices, said orifices producing a substantially continuous flame around the entire burner, and a downwardly extending flange carried by the striker plate and supported upon the burner adjacent the burner heads.

6. In a furnace, a fire-pot, a burner supported near the bottom of the fire-pot and comprising a plurality of substantially rectangular burner sections each having a horizontally disposed group of discharge orifices for directing a substantially continuous flame against the fire-pot and a group of discharge orifices directing a substantially continuous flame upwardly, and a striker plate covering the burner and having its periphery extending near the fire-pot above said last named discharge orifices.

7. In a furnace, a fire-pot, a striker plate means mounted therein and having its edge terminated at a point near the fire-pot wall, and a burner structure having burner orifices which project their flames against the fire-pot wall and thence through the space between the edge of the striker plate means and the fire pot wall, said means preventing air from passing up through the fire-pot other than through said space.

In testimony whereof I have hereunto signed my name to this specification.

HORATIO S. BENNETT.